(12) United States Patent
Camilo-Martinez et al.

(10) Patent No.: US 8,220,595 B2
(45) Date of Patent: Jul. 17, 2012

(54) BRAKE PAD FOR A DISC BRAKE

(75) Inventors: Jose Camilo-Martinez, Unterhaching (DE); Mario Springer, Eging am See (DE)

(73) Assignee: KNORR-BREMSE Systeme fuer Nutzfahzeuge GmbH, Munich (DE)

( * ) Notice: Subject to any disclaimer, the term of this patent is extended or adjusted under 35 U.S.C. 154(b) by 676 days.

(21) Appl. No.: 12/371,336

(22) Filed: Feb. 13, 2009

(65) Prior Publication Data

US 2009/0211857 A1 Aug. 27, 2009

(30) Foreign Application Priority Data

Feb. 22, 2008 (DE) .......................... 10 2008 010 570

(51) Int. Cl.
*F16D 65/40* (2006.01)
*F16D 65/00* (2006.01)
*F16D 69/00* (2006.01)
(52) U.S. Cl. ............... 188/73.38; 188/250 B; 188/250 E
(58) Field of Classification Search ............... 188/73.37, 188/73.38, 250 E, 250 F, 250 G, 250 B
See application file for complete search history.

(56) References Cited

U.S. PATENT DOCUMENTS

| 4,049,087 A | * | 9/1977 | Heinz et al. | ............ 188/73.38 |
| 4,784,242 A | | 11/1988 | Thioux | |
| 5,064,028 A | | 11/1991 | Antony et al. | |

FOREIGN PATENT DOCUMENTS

| DE | 40 20 287 A1 | 1/1992 |
| EP | 0 232 303 B1 | 8/1987 |
| EP | 0 534 987 B1 | 4/1993 |
| WO | WO 2007/068464 A1 | 6/2007 |

* cited by examiner

*Primary Examiner* — Bradley King
*Assistant Examiner* — Vishal Sahni
(74) *Attorney, Agent, or Firm* — Crowell & Moring LLP

(57) ABSTRACT

A brake pad for a disc brake, in particular for a utility or commercial vehicle, including a pad retaining spring which is designed as an arc-shaped leaf spring, can deflect radially and is fastened by way of a hood to a lining carrier plate which supports a friction lining material. The hood is formed as a separate component and has a section which is U-shaped in cross-section. A web of the hood connects its limbs which limbs are guided in parallel and at both sides of the lining carrier plate. The web bears against the pad retaining spring. The pad retaining spring is designed such that an opening is formed through which a limb of the hood is guided.

20 Claims, 6 Drawing Sheets

BRAKE PAD FOR A DISC BRAKE

CROSS-REFERENCE TO RELATED APPLICATION

This application claims priority under 35 U.S.C. §119 to German Patent Application No. DE 10 2008 010 570.8, filed Feb. 22, 2008, the entire disclosure of which is herein expressly incorporated by reference.

This application contains subject matter related to U.S. application Ser. No. 29/332,344, entitled "Brake Pad Retaining Spring and Holder", filed on even date herewith.

BACKGROUND AND SUMMARY OF THE INVENTION

The invention relates to a brake pad for a disc brake, in particular for a utility or commercial vehicle, having a pad retaining spring.

A brake pad of this type is known from WO 2007/068464 A1. Such a brake pad has been proven in principle, with significant advantages being the improved safety with regard to the non-reusability of the pad retaining spring and an improvement in the spring characteristic. Also cited as prior art are DE 40 20 287 A1, EP 232 303 B1, U.S. Pat. No. 5,064,028 A, U.S. Pat. No. 4,784,242 A and U.S. Pat. No. 4,049,087 A.

For optimum spring behavior, the pad retaining spring must have a corresponding width which is greater than the thickness of the lining carrier plate, such that the pad retaining spring projects at least at one side beyond the lining carrier plate.

To fasten a hood to the lining carrier plate, one of the two parallel limbs of the hood, which, in one section, is bent into a U-shape, engages in a positively locking manner into the lining carrier plate. To guide the two limbs as close as possible to the associated sides of the lining carrier plate, it is necessary for the pad retaining spring to be cut out in the region in which the hood engages over, to such an extent that, there, the pad retaining spring corresponds in terms of its width approximately to the thickness of the lining carrier plate. That is to say, the pad retaining spring is narrower in the region of overlap with the hood than in the region of the spring limbs which adjoin at both sides.

As has been proven, in the cut-out region, there is under some circumstances the risk of fatigue failure, since the pad retaining spring, on account of its function, undergoes frequent radial deflections, that is to say load cycles.

A desired optimized service life of the brake pad naturally opposes this situation, with an exchange of the brake pad solely for this reason leading to considerably increased costs, which result from the production of a new brake pad, the assembly and disassembly costs, and the costs for the vehicle being in a non-operational state.

The invention provides a brake pad wherein with little design and production expenditure, its service life, in particular that of its pad retaining spring, is increased.

In particular, a brake pad for a disc brake includes a pad retaining spring which is designed as an arc-shaped leaf spring, can deflect radially and is fastened by use of a hood to a lining carrier plate supporting a friction lining material. The hood is formed as a separate component and has a section which is U-shaped in cross-section. A web of the hood, which connects the limbs guided in parallel at both sides of the lining carrier plate, bears against the pad retaining spring. The pad retaining spring has an opening through which one limb of the hood is guided.

It is therefore now possible for the pad retaining spring to be designed so as to have, preferably, a constant width. This, first of all, advantageously results in a required and satisfactory fatigue strength even in the region of overlap with the hood, and secondly, allows the spring characteristic to remain unchanged to a defined and desired extent substantially over the entire length of the pad retaining spring. In other words, variations due to material weakening are substantially prevented.

According to one advantageous refinement of the invention, the opening, which is provided in the pad retaining spring, is designed as a longitudinal slot whose width corresponds approximately to the thickness of the metal sheet from which the hood is produced. Its length corresponds approximately to the width of the hood in the penetrated region. In this respect, the pad retaining spring is also secured against a longitudinal displacement.

According to another advantageous refinement of the invention, after being mounted on, that is to say after being fastened to, the lining carrier plate, the U-shaped section of the hood is shaped, by way of a connecting web which runs parallel to the web which bears against the pad retaining spring, so as to form a peripherally closed structure, wherein the free end of the connecting web can be cohesively connected to the associated limb, preferably by means of welding. It is, however, also possible to provide a positive locking connection, with interlocking positive-locking devices then being provided on the limb, on the one hand, and on the connecting web, on the other hand.

For the leadthrough of the connecting web, the lining carrier plate has a passage opening, which is dimensioned such that a longitudinal displacement of the pad retaining spring (and of the hood which is fastened thereto) is substantially prevented, while a radial movement is easily possible, corresponding to the spring stroke.

For this purpose, a rectangular or square opening can be provided in the lining carrier plate, which opening, if the lining carrier plate is cast, is concomitantly cast during the casting process, or which opening, if the lining carrier plate is composed of a sheet-metal molded part, is punched-in.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
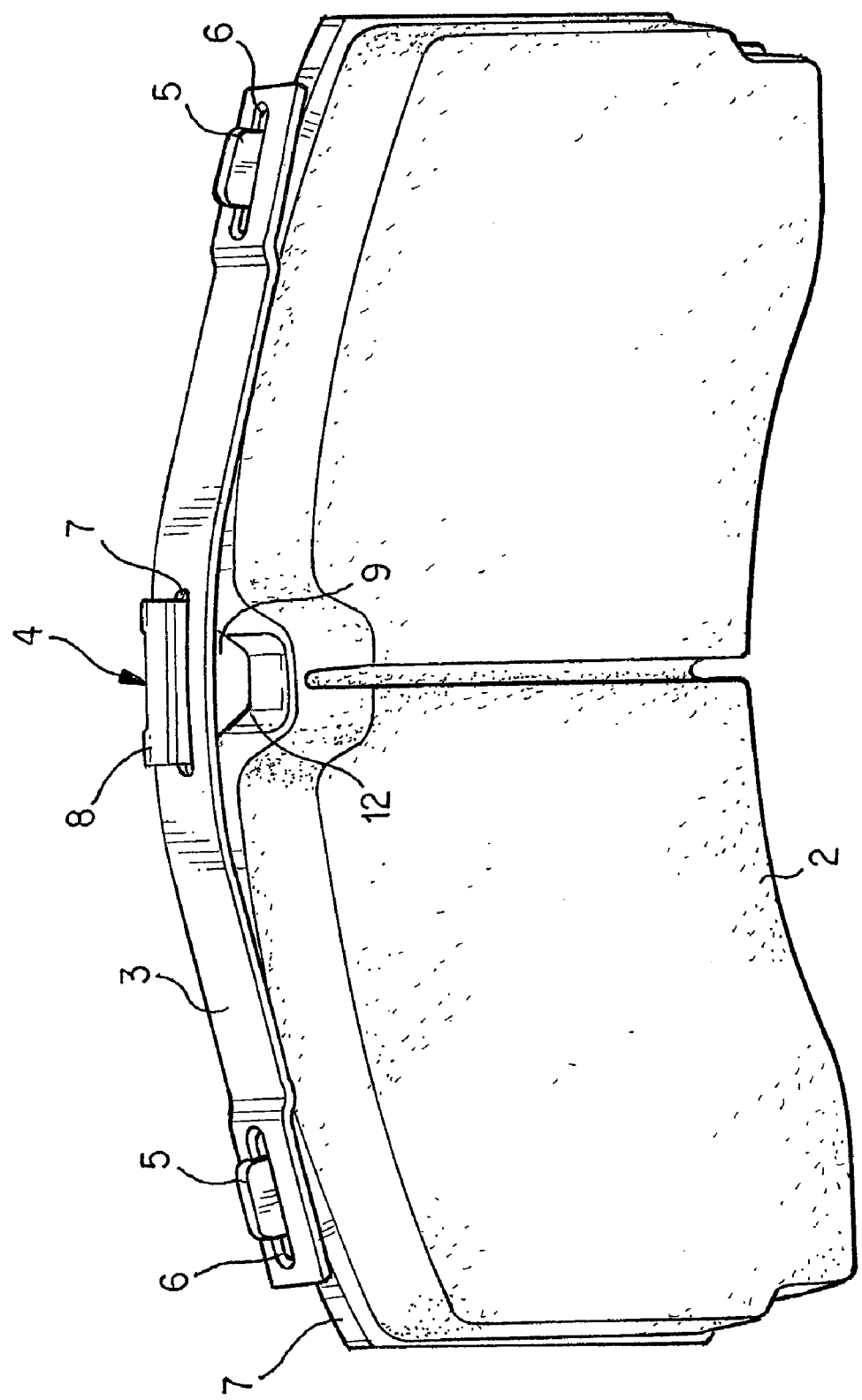
FIGS. 1 to 3 show a brake pad according to the invention, in a different view in each case.
Figure 2:
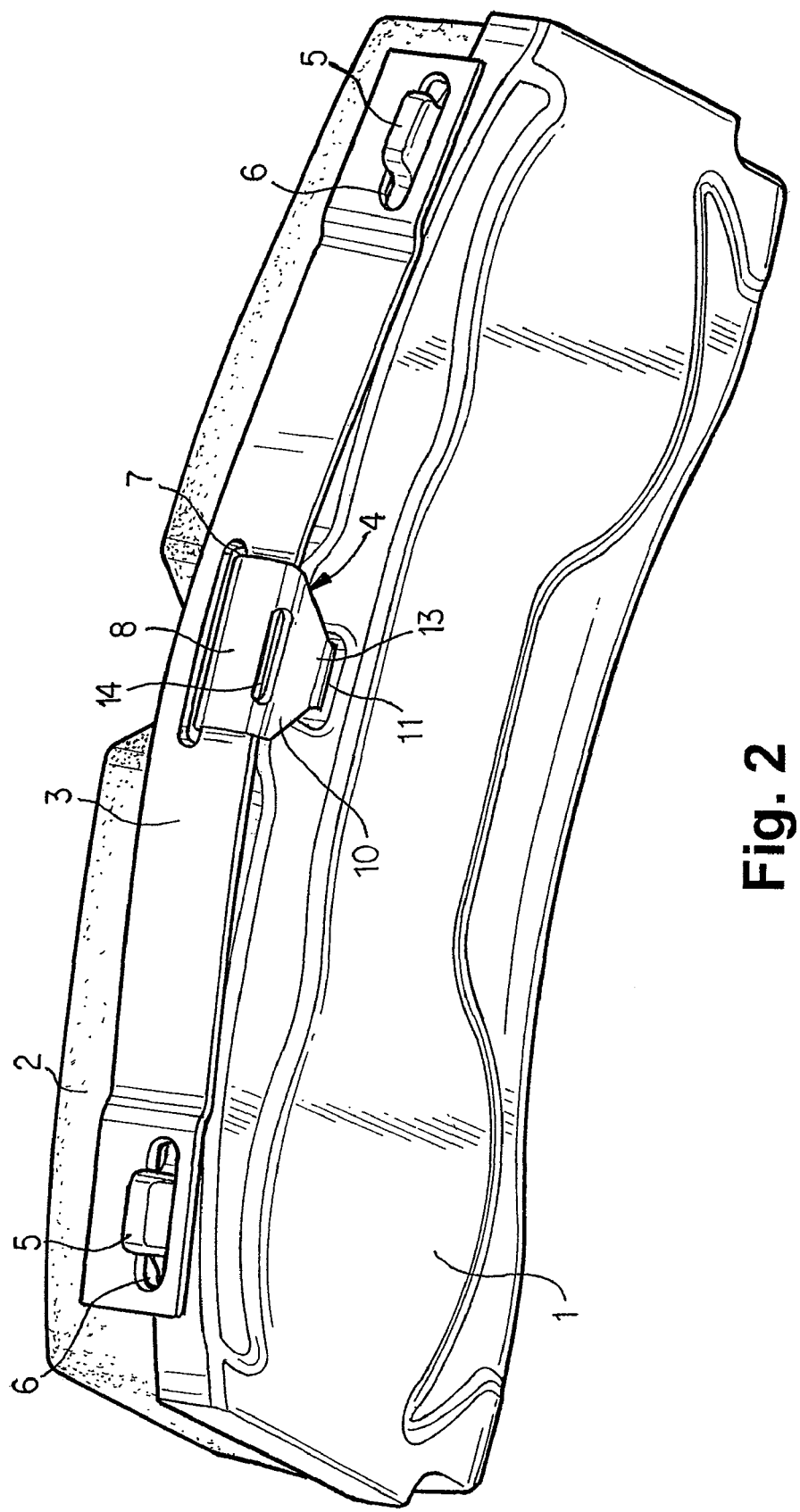
Figure 3:
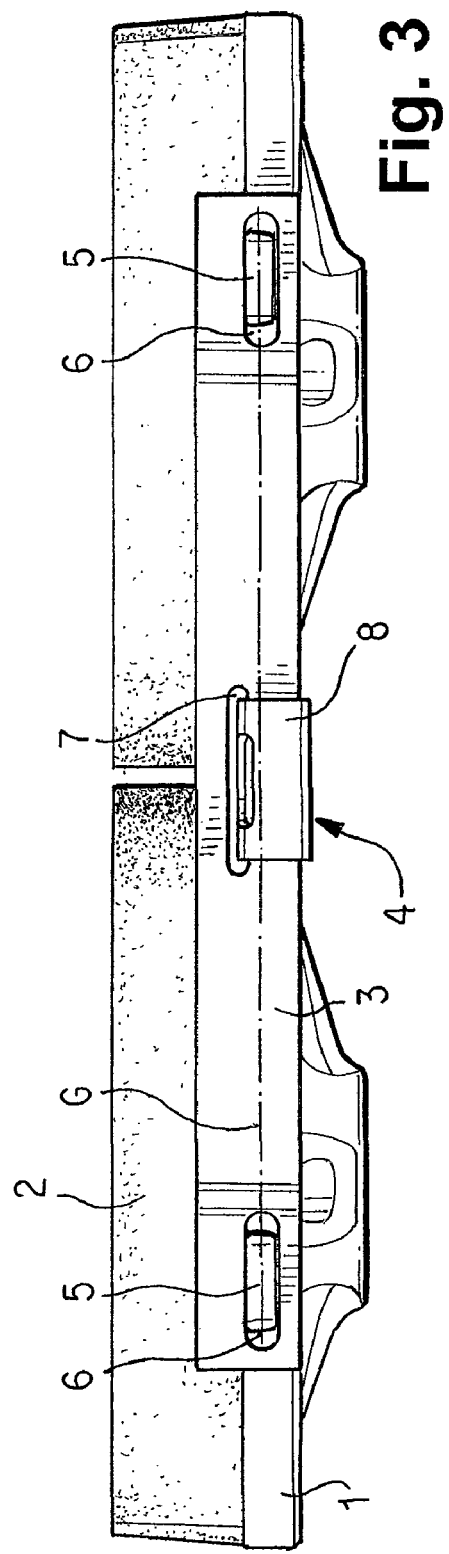

FIGS. 1 to 3 illustrate a brake pad for a disc brake, which brake pad is composed, in terms of its basic design, of a preferably cast lining carrier plate 1 and of a friction lining material 2. The friction lining material 2 is fastened to the lining carrier plate and, during a braking process, is placed in frictional contact with a brake disc of the disc brake.

Figure 4:
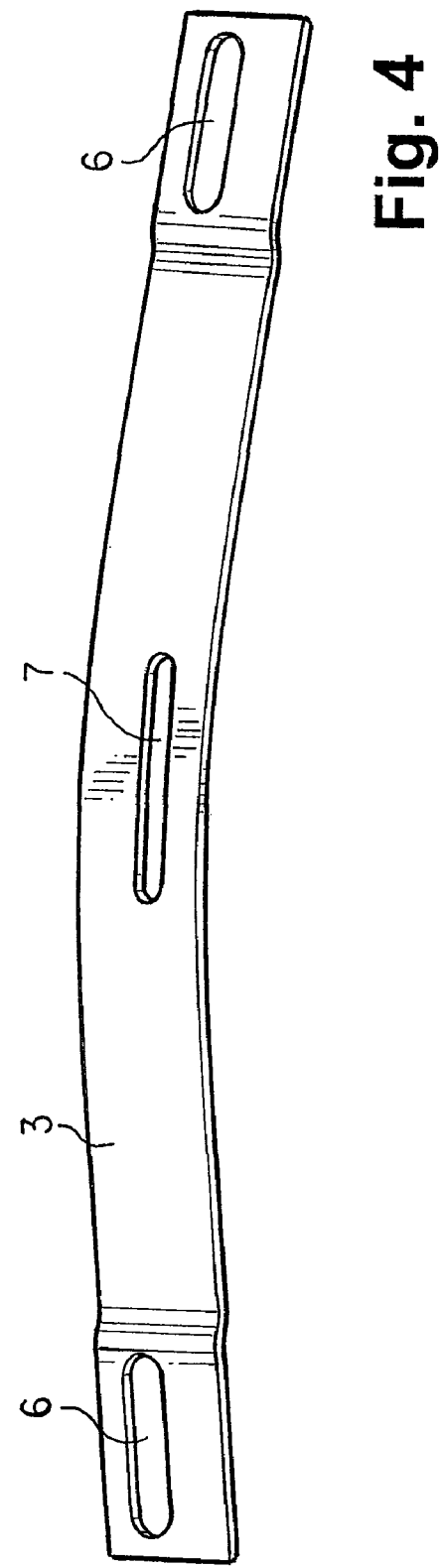
FIGS. 4 and 5 show, in each case, a detail of the brake pad, in perspective views.

A pad retaining spring 3 is preferably non-detachably fastened to, or arranged/held on, a longitudinal edge of the lining carrier plate 1. Slots 6 are provided at the two opposite end regions of the pad retaining spring 3, through which slots 6 extend lugs 5, which are integrally formed on the lining carrier plate 1. The pad retaining spring 3 is illustrated in detail in FIG. 4.

For the preferably non-detachable connection of the pad retaining spring 3 to the lining carrier plate 1, a hood 4 is provided. The hood 4, as shown alone in particular in FIG. 5, has a section which is U-shaped in cross-section with two parallel limbs 9, 10, which are connected to one another by way of a web 8.

Approximately symmetrically between the slots 6, a longitudinal slot 7 is formed into the pad retaining spring 3, through which longitudinal slot 7 the limb 9 is inserted, which limb 9, like the opposite limb 10, bears against or almost bears against an associated major surface side of the lining carrier plate 1.

As can be clearly seen from FIG. 3, the pad retaining spring 3 is wider than the thickness of the lining carrier plate 1, such that the pad retaining spring 3 projects in the direction of the friction lining material 2 while the other longitudinal edge of said pad retaining spring 3 is approximately aligned with the rear side of the lining carrier plate 1.

Figure 5:
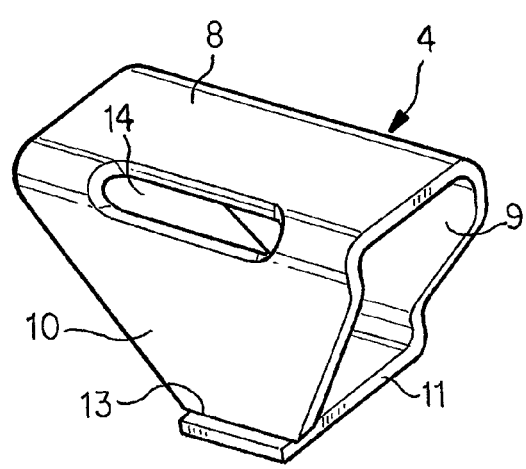

It can also be seen in FIG. 5 that a connecting web 11 adjoins the limb 9, which connecting web 11 runs parallel to the web 8. The connecting web 11 extends through a recess 12, which is provided in the lining carrier plate 1 (FIG. 1). The connecting web 11 forms, with the other limb 10, a connecting seam 13, which may be produced, for example, by way of welding when the hood 4 is mounted.

By means of the cohesive connection, a non-destructive release of the hood 4 is prevented, as a result of which secure fastening of the pad retaining spring 3 is ensured.

Furthermore, the limbs 9, 10 have a generally trapezoidal design in terms of their outline, with the wide side being formed by the web 8 while the connecting web 11 delimits the narrower side.

For easier deformation of the hood 4 after assembly, that is to say after the hood 4 is placed onto the pad retaining spring 3 and the connecting limb 11 is guided through the recess 12, a weakened wall portion in the form of a cutout 14, which runs transversely with respect to the bending direction, is provided between the web 8 and the limb 10. This allows the limb 10 to be bent with respect to the web 8 with little force expenditure.

As already stated, the longitudinal slot 7 is arranged preferably approximately centrally in relation to the longitudinal extent of the pad retaining spring. The longitudinal slot 7 is very particularly preferably arranged exactly at the midpoint. Furthermore, the longitudinal slot dimensions correspond approximately to the width and to the thickness D of the inserted limb 9, which limb 7 must, however, still be capable of being inserted into the longitudinal slot 7.

According to one embodiment (not illustrated here), the slots 6, which serve to guide the pad retaining spring at its ends, and the longitudinal slot 7 may be aligned with one another. However, the longitudinal slot 7 and the slots 6 preferably do not lie on a straight line G, as can be seen, for example, in FIG. 3.

In this respect, it is particularly preferable for the slots 6, which serve for guidance, to be aligned with one another while the longitudinal slot 7 lies so as to be spaced apart from and parallel to the straight line G, which extends through the two slots 6 or connects the latter to one another (FIG. 3).

It is also preferable for the width B1 of that region of the pad retaining spring over which the hood 4 engages to be greater than half of the total width B of the pad retaining spring in order to ensure satisfactory stability of the arrangement.

The straight line G which connects the slots 6 to one another extends here through that region of the pad retaining spring 3 over which the hood 4 engages, which ensures a particularly advantageously stable arrangement.

Figure 6A:
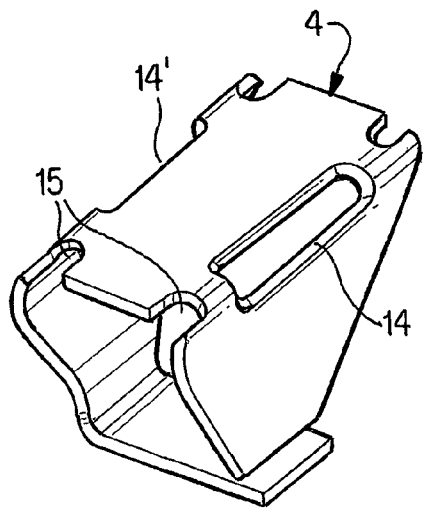
FIGS. 6a-6c show different exemplary hood embodiments of the brake pads.
Figure 6B:
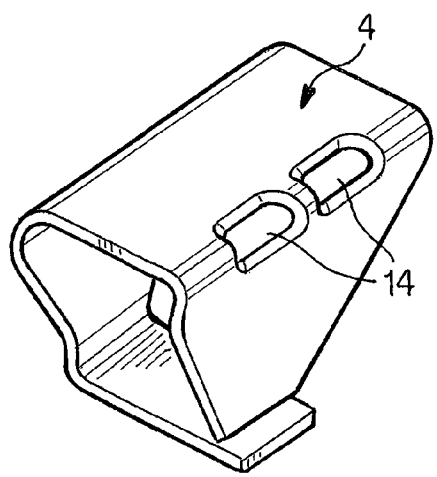
Figure 6C:
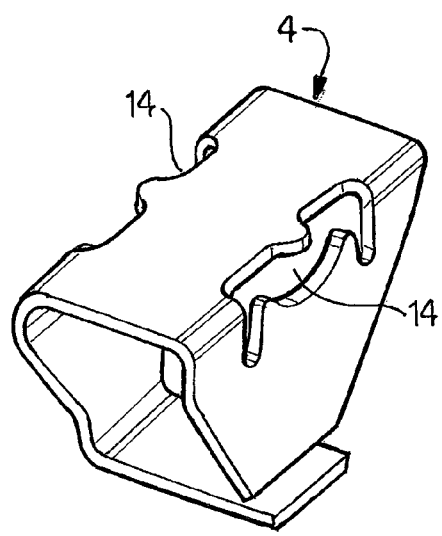

FIGS. 6a to 6c show variants of hoods 4, which differ from one another in particular with regard to the cutouts 14.

According to FIG. 6a, in each case one relatively long cutout 14 between the web 8 and the limb 10 is supplemented by edge cutouts 15, which supplement the cutout 14, as a result of which the limb 10 can be bent with respect to the web 8 with a further reduced level of force expenditure. Furthermore, a further cutout 14' is provided between the web 8 and the limb 9, in order to facilitate the bending of the hood 4 in that region too during the production of the hood 4.

According to FIG. 6b, in contrast, in each case two (or more) cutouts 14, 14' are provided between the web 8 and the two adjoining limbs 9, 10 in the region of each bend, which limbs 9, 10 lie precisely in the region of the respective bend lines after the bending process.

According to FIG. 6c, it is provided that the cutouts have a contoured design, which may further optimize the bending and stability properties. For example, the cutouts may be of an elongated design (FIG. 6a) or may initially, for example during the punching of the cutouts before the bending process, form a type of W-shaped or M-shaped contour (FIG. 6c).

Figure 7:
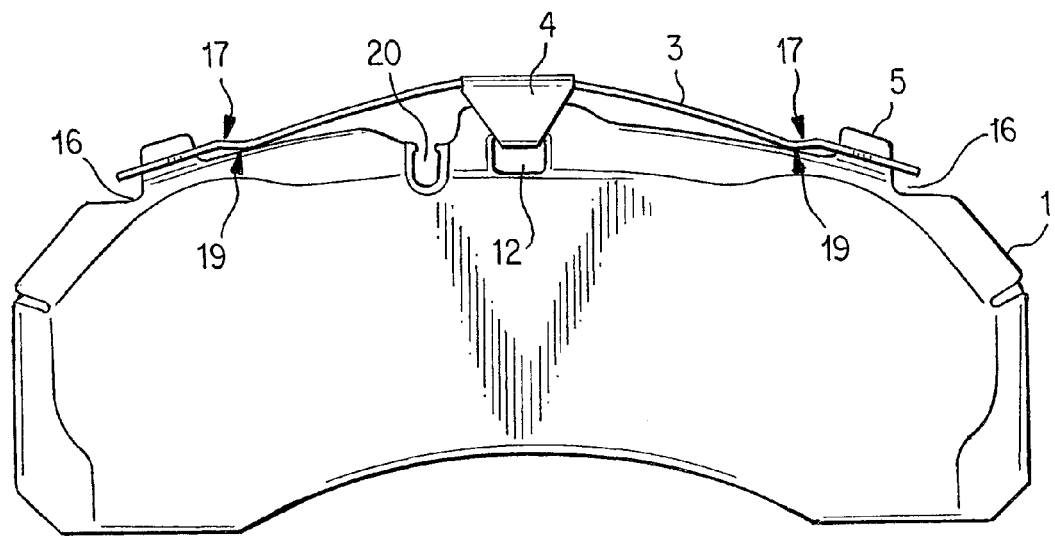
FIG. 7 shows a view of a further brake pad.

FIG. 7 shows a side view of another brake pad. It is possible to particularly clearly see the recess 12, which extends radially in the lining carrier plate 1, such that a corresponding radial deflection of the hood in the recess 12 is possible (for example by more than 2 mm).

The lining carrier plate 1 is provided with peripheral edge cutouts 16 in each case outside the lugs 5 as viewed from the direction of the hood 4, which peripheral edge cutouts 16 are designed such that those ends of the pad retaining spring 3 which face away from the hood 4 extend into the peripheral edge cutouts 16. The pad retaining spring 3 therefore bears against the lining carrier plate 1 not in the region of the outermost ends, which face away from the hood 4, of the pad retaining spring 3, but rather in step regions 17 between the lugs 5 of the lining carrier plate 1, which results in a particularly advantageous spring characteristic.

The step regions 17 are produced by correspondingly bending the pad retaining spring 3. The step regions 17 are designed such that the pad retaining spring 3, proceeding from the support regions 19 on the lining carrier plate 1, is bent firstly away from the lining carrier plate 1 "upward" and then "downward". This generates a corresponding step in the spring characteristic, which in turn has an advantageous effect on the stability of the arrangement and the behavior of the arrangement during operation.

It is then also contemplated for the outer slots 6 to be designed, at their ends which face away from one another, to be open in the outward direction. For the guidance of the pad retaining spring 3 at its ends, it would ultimately also be possible to provide some means other than the corresponding slots 6 and the lugs 5, although the lugs 5 and slots 6 are preferable since they are particularly simple, functionally reliable, and expedient.

It should also be noted that the recess 12 and the spacing between the pad retaining spring 3 and the peripheral edge of the lining carrier plate in the region of the hood 4 are preferably dimensioned radially such that the hood 4 cannot come into contact with the lower edge of the recess 12—that is to say at that edge of the recess 12 which faces away from the pad retaining spring 3. The hood 4 can therefore deflect radially in the recess 12, preferably together with the pad retaining spring 3, but cannot abut against the lower edge of the recess 12, and this in turn has an advantageous effect on the behavior of the arrangement.

In the side view of FIG. 7, it can also be seen that the hood 4, from its region which engages around the pad retaining spring 3, becomes narrower in the direction of the recess 12, and is preferably of a trapezoidal design.

The hood 4 preferably extends through the pad retaining spring 3, since the pad retaining spring 3 is thereby also particularly effectively captively held on the lining carrier plate 1, and preferably supported on the latter, in this way.

Alternatively, however, in another embodiment, the hood could also engage in radial grooves on both sides of the lining carrier plate, and not extend all the way through the latter (not illustrated).

Figure 8:
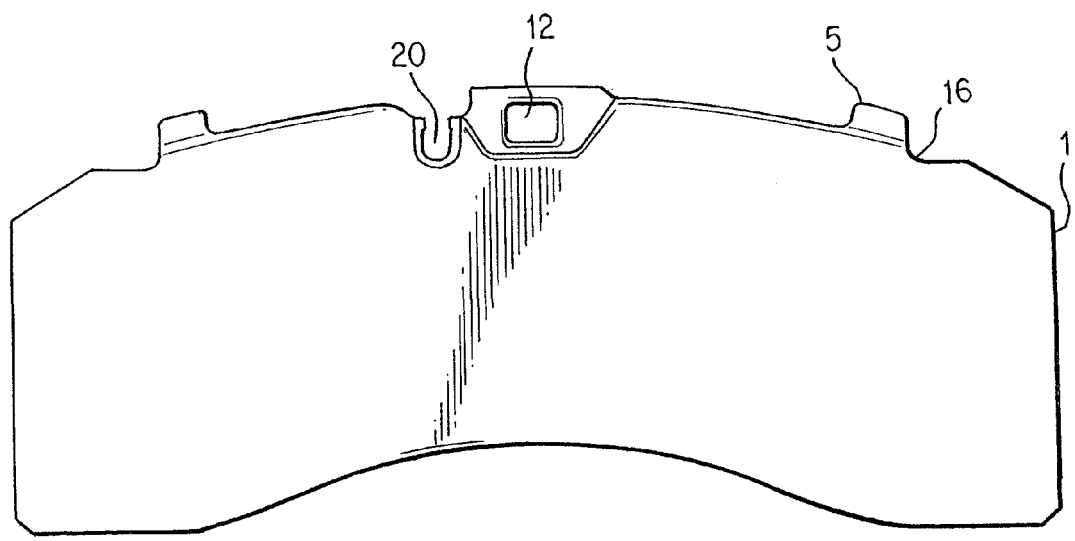
FIG. 8 shows a lining carrier plate for the brake pad from FIG. 6.
Figure 9:
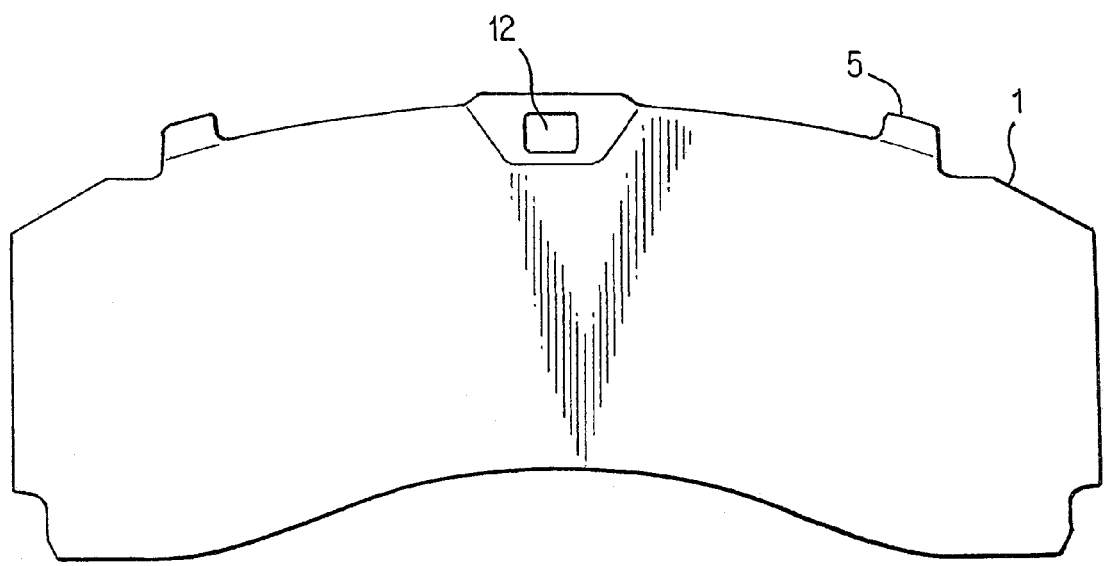
FIG. 9 shows a further lining carrier plate.

It should also be noted that, in FIG. 8, a recess 20 is also provided in the peripheral edge of the lining carrier plate 1, which recess 20 preferably serves to hold a brake pad wear sensor as is known per se. The recess 8 is not present in FIG. 9.

The length of the longitudinal slot is preferably between 10 and 40 mm.

TABLE OF REFERENCE SYMBOLS

1 Lining carrier plate
2 Friction lining material
3 Pad retaining spring
4 Hood
5 Lug
6 Slot
7 Longitudinal slot
8 Web
9 Limb
10 Limb
11 Connecting web
12 Recess
13 Connection seam
14 Cutout (also 14')
15 Edge cutout
16 Peripheral edge cutout
17 Step region
19 Support region
20 Recess
G Straight line
B, B1 Widths The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake pad for a disc brake, the brake pad comprising:
    a lining carrier plate supporting a friction lining material;
    a pad retaining spring operatively configured as an arc-shaped leaf spring that is radially deflectable relative to the lining carrier plate;
    a hood operably configured to fasten the pad retaining spring to the lining carrier plate, the hood being a separate component having a U-shaped cross-section;
    wherein a web of the hood connects first and second limbs, said limbs extending in parallel to one another with one limb being arranged, respectively, on each side of the lining carrier plate; and
    wherein the web of the hood bears against the pad retaining spring, the pad retaining spring including an enclosed opening through which one of the limbs of the hood is guided.

2. The brake pad according to claim 1, wherein the opening in the pad retaining spring is a longitudinal slot.

3. The brake pad according to claim 1, wherein the pad retaining spring maintains a substantially constant width over its entire length.

4. The brake pad according to claim 2, wherein the pad retaining spring maintains a substantially constant width over its entire length.

5. The brake pad according to claim 2, wherein the longitudinal slot is arranged approximately centrally in the pad retaining spring with respect to a longitudinal extent of the pad retaining spring.

6. The brake pad according to claim 2, wherein the longitudinal slot has a length corresponding approximately to a width of the limb guided through the opening.

7. The brake pad according to claim 5, wherein the longitudinal slot has a length corresponding approximately to a width of the limb guided through the opening.

8. The brake pad according to claim 2, wherein the longitudinal slot has a width corresponding approximately to a thickness of the limb guided through the opening.

9. The brake pad according to claim 5, wherein the longitudinal slot has a width corresponding approximately to a thickness of the limb guided through the opening.

10. The brake pad according to claim 7, wherein the longitudinal slot has a width corresponding approximately to a thickness of the limb guided through the opening.

11. The brake pad according to claim 2, further comprising two additional slots arranged in the pad retaining spring, wherein the longitudinal slot and the two additional slots are not aligned with one another along a longitudinal axis of the pad retaining spring.

12. The brake pad according to claim 1, wherein the hood further comprises a connecting web integrally formed on one of the limbs, the connecting web being arranged parallel to the web and passing through a recess in the lining carrier plate.

13. The brake pad according to claim 12, wherein the connecting web integrally formed on the one limb is positively connected to the other limb on an opposite side of the recess.

14. The brake pad according to claim 13, wherein the positive connection is via a weld.

15. The brake pad according to claim 1, wherein the hood further comprises at least one cutout arranged at a bending edge between the web and at least one of the first and second limbs.

16. The brake pad according to claim 1, wherein the hood further comprises one or more edge cutouts arranged at a bending edge between the web and at least one of the first and second limbs.

17. The brake pad according to claim 15, wherein the at least one cutout includes a longitudinal length extending in a direction of the bending edge.

18. The brake pad according to claim 15, wherein the at least one cutout has a W-shape.

19. The brake pad according to claim 1, wherein the lining carrier plate comprises first and second lugs being arranged, respectively, on each side of the hood; and wherein peripheral edge cutouts are arranged on the lining carrier plate on each side of the first and second lugs away from the hood, the peripheral edge cutouts being operatively configured such that respective ends of the pad retaining spring, which face away from the hood, extend into the peripheral edge cutouts.

20. The brake pad according to claim 19, wherein the pad retaining spring bears against the lining carrier plate in areas that are not at outermost ends of the pad retaining spring, but rather in stepped regions of the pad retaining spring operatively configured so as to be arranged between the lugs of the lining carrier plate.

* * * * *